(12) United States Patent
Powell (10) Patent No.: US 7,189,041 B1
(45) Date of Patent: Mar. 13, 2007

(54) RETRACTABLE LOAD SUPPORT SYSTEM

(76) Inventor: Mitchell E. Powell, 198 Summer Way, Waynesville, NC (US) 28786

( * ) Notice: Subject to any disclaimer, the term of this patent is extended or adjusted under 35 U.S.C. 154(b) by 0 days.

(21) Appl. No.: 11/159,930

(22) Filed: Jun. 23, 2005

(51) Int. Cl.
*B60P 1/00* (2006.01)

(52) U.S. Cl. ............................ 410/52; 410/94; 410/121

(58) Field of Classification Search ................ 410/52, 410/121, 80, 90, 91, 94, 95, 153; 414/495, 414/347, 349, 535, 540, 546
See application file for complete search history.

(56) References Cited

U.S. PATENT DOCUMENTS

| | | | |
|---|---|---|---|
| 2,693,286 A | 11/1954 | Cocks | 214/84 |
| 3,011,665 A | 12/1961 | Wise | 214/84 |
| 3,239,081 A | 3/1966 | Poleschuk | 214/84 |
| 4,472,618 A * | 9/1984 | Cloer | |
| 4,684,311 A | 8/1987 | Dickson-Wroght et al. | 414/535 |
| 4,784,547 A * | 11/1988 | Prinz et al. | 410/52 |
| 4,823,927 A | 4/1989 | Jensen | 193/35 |
| 4,887,937 A | 12/1989 | Thunnissen | 414/527 |
| 4,967,894 A | 11/1990 | Thunnissen | 193/35 |
| 5,088,585 A | 2/1992 | Lambert | 193/35 |
| 5,542,809 A | 8/1996 | Kita et al. | 414/528 |
| 6,193,043 B1 | 2/2001 | Langston et al. | 193/35 |
| 6,382,385 B2 | 5/2002 | Ransil et al. | 193/35 |
| 6,585,473 B2 | 7/2003 | Turner | 414/535 |
| 6,746,199 B2 | 6/2004 | Carawan et al. | 414/535 |
| 2003/0017037 A1 | 1/2003 | Turner | 414/535 |

FOREIGN PATENT DOCUMENTS

| | | |
|---|---|---|
| EP | 282122 | 2/1988 |
| JP | 54-120181 | 9/1979 |

\* cited by examiner

*Primary Examiner*—Stephen Gordon (57) ABSTRACT

A retractable load support system for selectively raising a load from the bed of a trailer for allowing the usage of a forklift for loading and unloading the load. The retractable load support system includes a trailer having a bed, a plurality of openings within the bed, a plurality of supports extendable through the openings, a plurality of support members attached to the supports, and at least one actuator attached to the trailer and the support members for selectively lowering and raising the plurality of supports. A locking bar is extendable through locking apertures within the support members and a support frame of the trailer for locking the supports in a raised position.

16 Claims, 8 Drawing Sheets

RETRACTABLE LOAD SUPPORT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to flatbed trailers and more specifically it relates to a retractable load support system for selectively raising a load from the bed of a trailer for allowing the usage of a forklift for loading and unloading the load.

2. Description of the Related Art

Any discussion of the prior art throughout the specification should in no way be considered as an admission that such prior art is widely known or forms part of common general knowledge in the field.

Conventional flatbed trailers have been in use for years. Conventional flatbed trailers have a bed having a solid surface for supporting a load. If the load is comprised of a structure that requires elevation to get the forks of a forklift underneath, a truck driver will typically position 4×4 inch boards beneath the load as it is positioned on the bed of the flatbed trailer to elevate the load.

A problem with conventional flatbed trailers is that they require the truck driver to carry and store large boards on their truck. Another problem with conventional flatbed trailers is that they are not adjustable for receiving various types of loads.

While these devices may be suitable for the particular purpose to which they address, they are not as suitable for selectively raising a load from the bed of a trailer for allowing the usage of a forklift for loading and unloading the load. Conventional flatbed trailers require a truck driver to bring large boards with them to support various types of loads.

In these respects, the retractable load support system according to the present invention substantially departs from the conventional concepts and designs of the prior art, and in so doing provides an apparatus primarily developed for the purpose of selectively raising a load from the bed of a trailer for allowing the usage of a forklift for loading and unloading the load.

BRIEF SUMMARY OF THE INVENTION

In view of the foregoing disadvantages inherent in the known types of flatbed trailers now present in the prior art, the present invention provides a new retractable load support system construction wherein the same can be utilized for selectively raising a load from the bed of a trailer for allowing the usage of a forklift for loading and unloading the load.

The general purpose of the present invention, which will be described subsequently in greater detail, is to provide a new retractable load support system that has many of the advantages of the flatbed trailers mentioned heretofore and many novel features that result in a new retractable load support system which is not anticipated, rendered obvious, suggested, or even implied by any of the prior art flatbed trailers, either alone or in any combination thereof.

To attain this, the present invention generally comprises a trailer having a bed, a plurality of openings within the bed, a plurality of supports extendable through the openings, a plurality of support members attached to the supports, and at least one actuator attached to the trailer and the support members for selectively lowering and raising the plurality of supports. A locking bar is extendable through locking apertures within the support members and a support frame of the trailer for locking the supports in a raised position.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a retractable load support system that will overcome the shortcomings of the prior art devices.

A second object is to provide a retractable load support system for selectively raising a load from the bed of a trailer for allowing the usage of a forklift for loading and unloading the load.

Another object is to provide a retractable load support system that eliminates the need for truckers to store, place and remove 4×4 lumber on their flatbed trailers to support loads.

An additional object is to provide a retractable load support system that allows the flatbed trailer to be utilized for loads that do not require elevation (e.g. vehicles, pallet supported loads).

A further object is to provide a retractable load support system that allows the flatbed trailer to be utilized for loads that require elevation (e.g. lumber, boxes).

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 6 illustrate a retractable load support system 10, which comprises a trailer 20 having a bed 24, a plurality of openings within the bed 24, a plurality of supports extendable through the openings, a plurality of support members attached to the supports, and at least one actuator 60 attached to the trailer 20 and the support members for selectively lowering and raising the plurality of supports. A locking bar 70 is extendable through locking apertures 72 within the support members and a support frame 26 of the trailer 20 for locking the supports in a raised position.

B. Trailer

Figure 1:
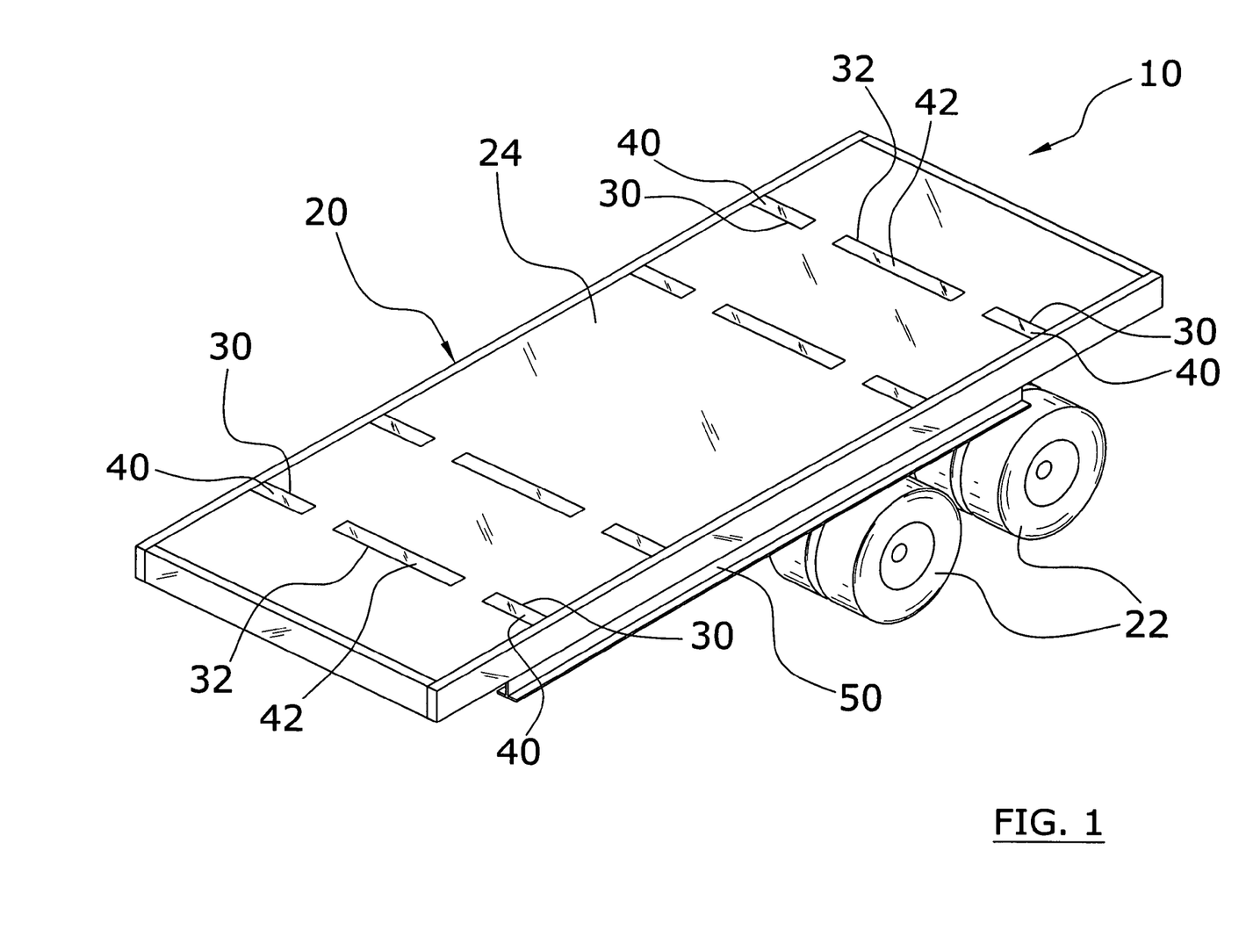
FIG. 1 is an upper perspective view of the present invention with the support members lowered.
Figure 2:
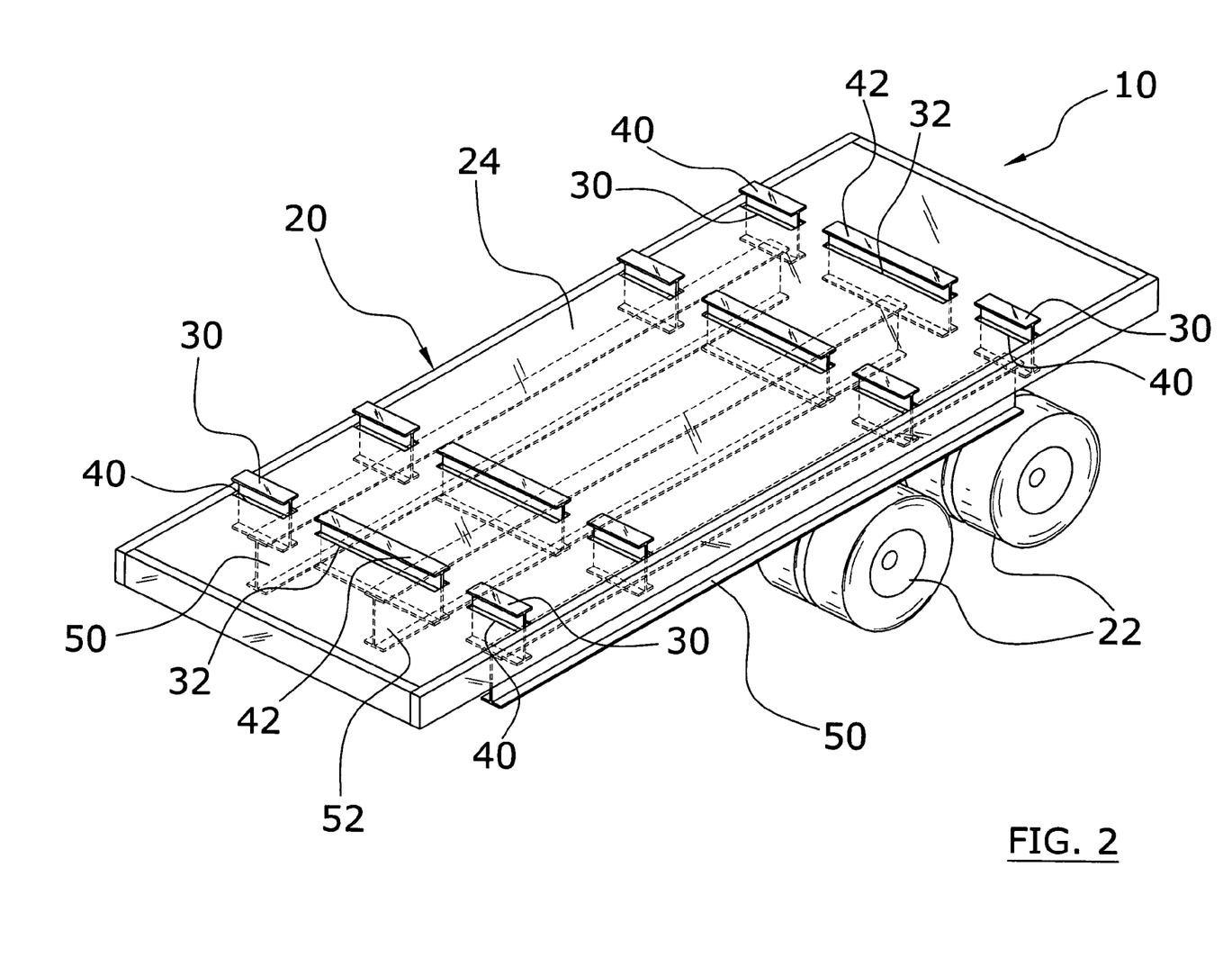
FIG. 2 is an upper perspective view of the present invention with the support members raised.

As illustrated in FIGS. 1 through 6 of the drawings, the trailer 20 has a bed 24 and a plurality of wheels 22. As best illustrated in FIG. 1 of the drawings, the trailer 20 is preferably comprised of a flatbed structure or similar structure for receiving various types of loads 12. The bed 24 may have an elongated rectangular structure as illustrated in FIGS. 1 and 2 of the drawings. The trailer 20 also includes a support frame 26 which is well known in the art of flatbed trailers 20.

C. Openings

A plurality of openings 30, 32 extend within the bed 24 of the trailer 20 as illustrated in FIG. 1 of the drawings. The plurality of openings 30, 32 within the bed 24 are preferably comprised of a plurality of center openings 32 and a plurality of outer openings 30 as best illustrated in FIG. 1 of the drawings.

The plurality of center openings 32 are preferably aligned with a longitudinal axis of the bed 24 as best illustrated in FIG. 2 of the drawings. The plurality of outer openings 30 are positioned on opposing sides of the center openings 32 as shown in FIG. 1 of the drawings. The plurality of outer openings 30 preferably form two opposing rows on opposing sides of the center openings 32.

D. Supports

The plurality of supports movably extend through the openings 30, 32 as shown in FIGS. 1 through 6. The plurality of supports 40, 42 preferably include a plurality of center supports 42 movably positioned within the plurality of center openings 32 as illustrated in FIGS. 1 and 2 of the drawings. The plurality of supports 40, 42 also preferably include a plurality of outer supports 40 movably positioned within the plurality of outer openings 30 as further shown in FIGS. 1 and 2 of the drawings. The supports 40, 42 preferably have a broader upper end for supporting the load 12.

E. Support Members

The plurality of support members 50, 52 are attached to the supports 40, 42 as illustrated in FIG. 2 of the drawings. A center support member 52 is attached to the center supports 42 for supporting the same as shown in FIG. 2 of the drawings. One or more outer support members 50 are attached to the outer supports 40 as shown in FIG. 2 of the drawings. The support members 50, 52 are preferably comprised of elongated rigid structures capable of lifting even and uneven loads 12 placed on the supports 40, 42.

F. Actuator

At least one actuator 60 is attached to the trailer 20 and the support members 50, 52 for selectively lowering and raising the supports 40, 42 with respect to the bed 24 of the trailer 20 as shown in FIGS. 3a through 5c of the drawings. A center actuator 60 is attached to the center support member 52 for raising and lowering the center support member 52. One or more outer actuators 60 are attached to the outer support members 50 for raising and lowering the outer support members 50.

Figure 6:
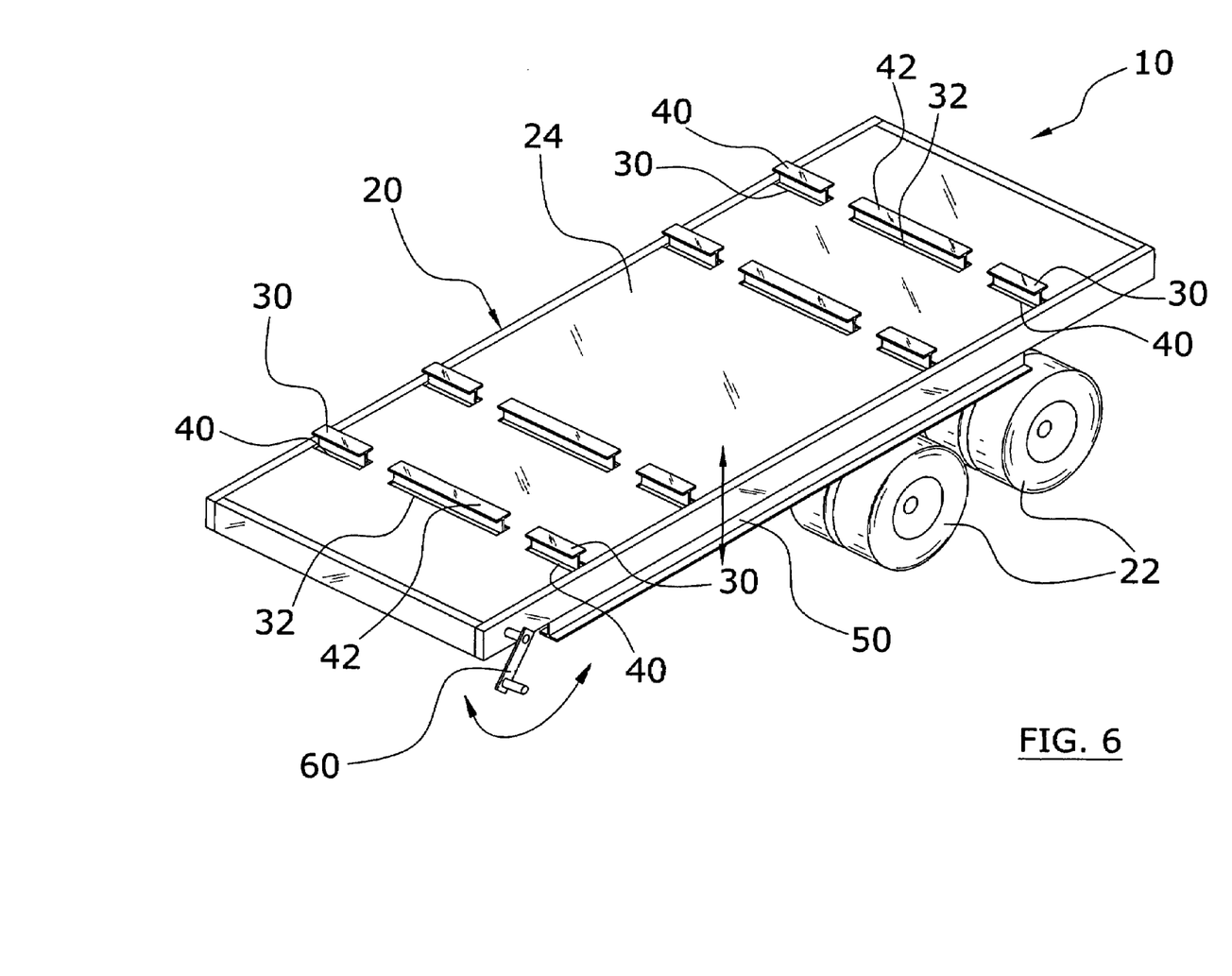
FIG. 6 is an upper perspective view of an alternative elevating and lowering structure.

The actuators 60 may be comprised of any actuating device (e.g. hydraulic cylinder, etc.). A control unit (not shown) is in communication with the actuators 60 for controlling the raising and lowering of the actuators 60. FIG. 6 illustrates an alternative actuator 60 comprised of a manually operated crank structure that raises and lowers the support members 50, 52 utilizing conventional mechanical structures.

G. Locking Structure

Figure 4A:
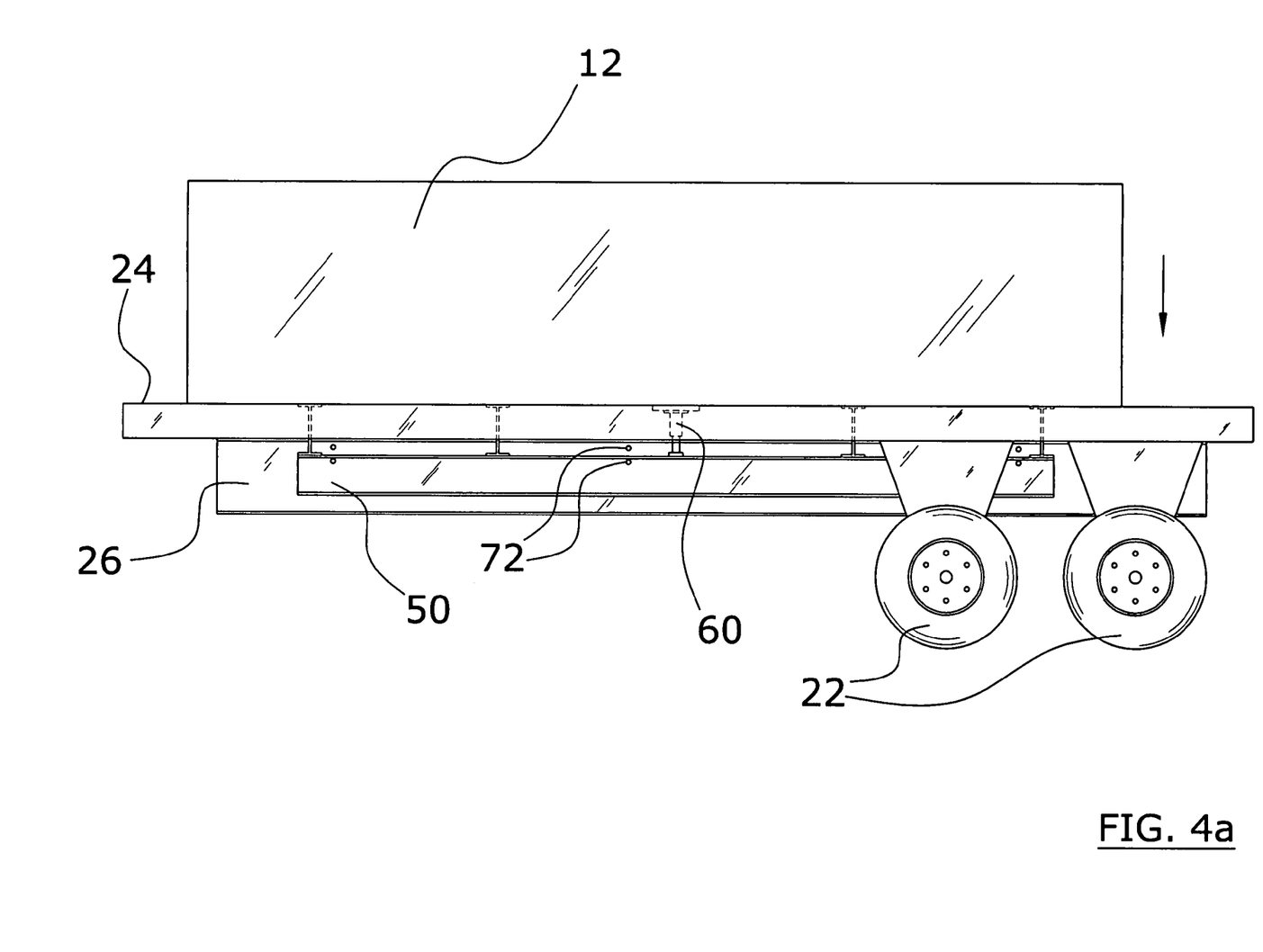
FIG. 4a is a side view of the present invention with a load supported directly on the bed of the trailer with the support members lowered.
Figure 5A:
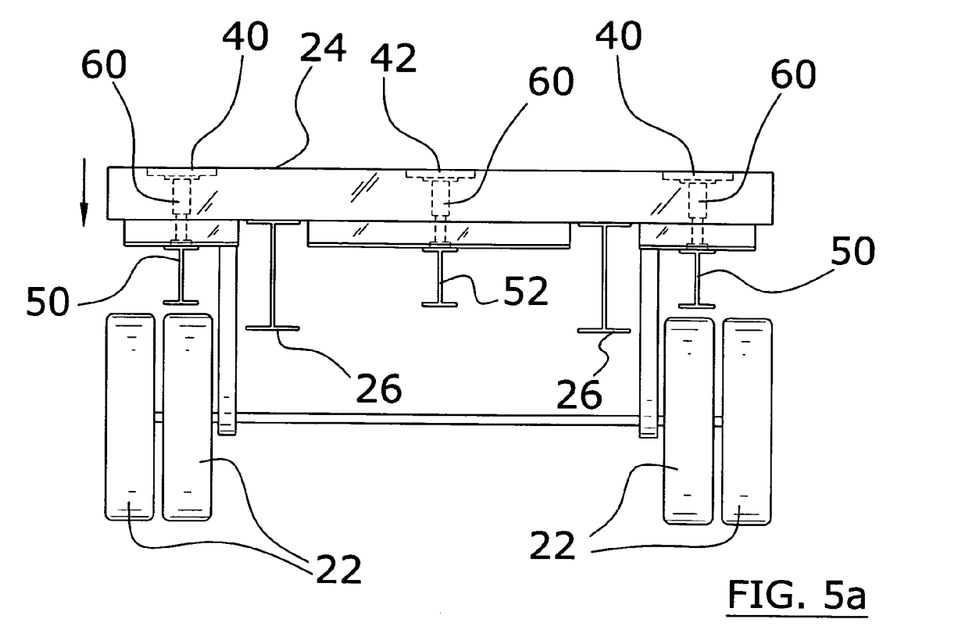
FIG. 5a is a rear end view of the present invention with the support members lowered.
Figure 5B:
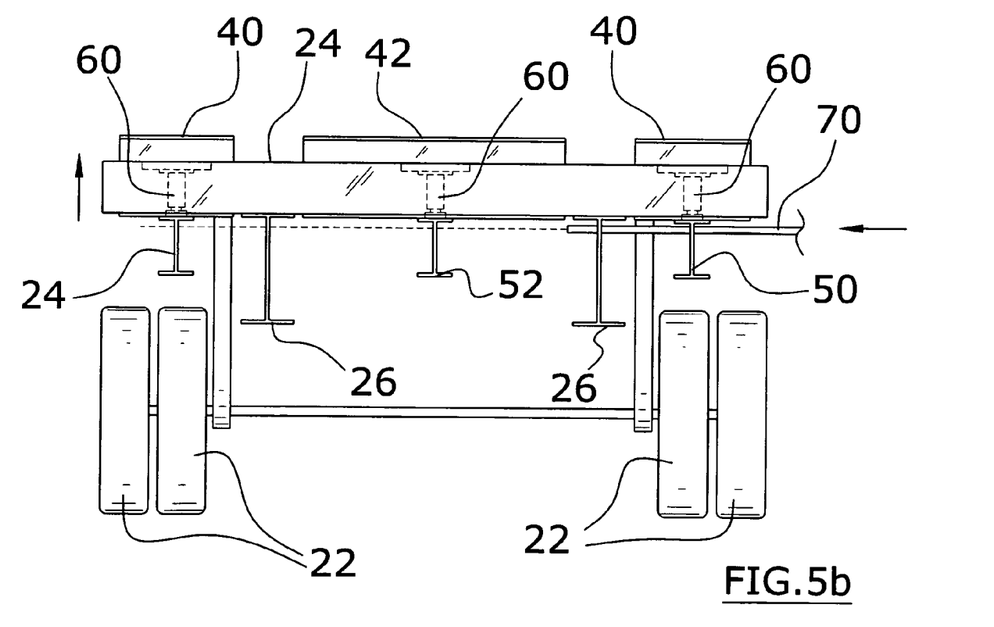
FIG. 5b is a rear end view of the present invention with the support members raised.
Figure 5C:
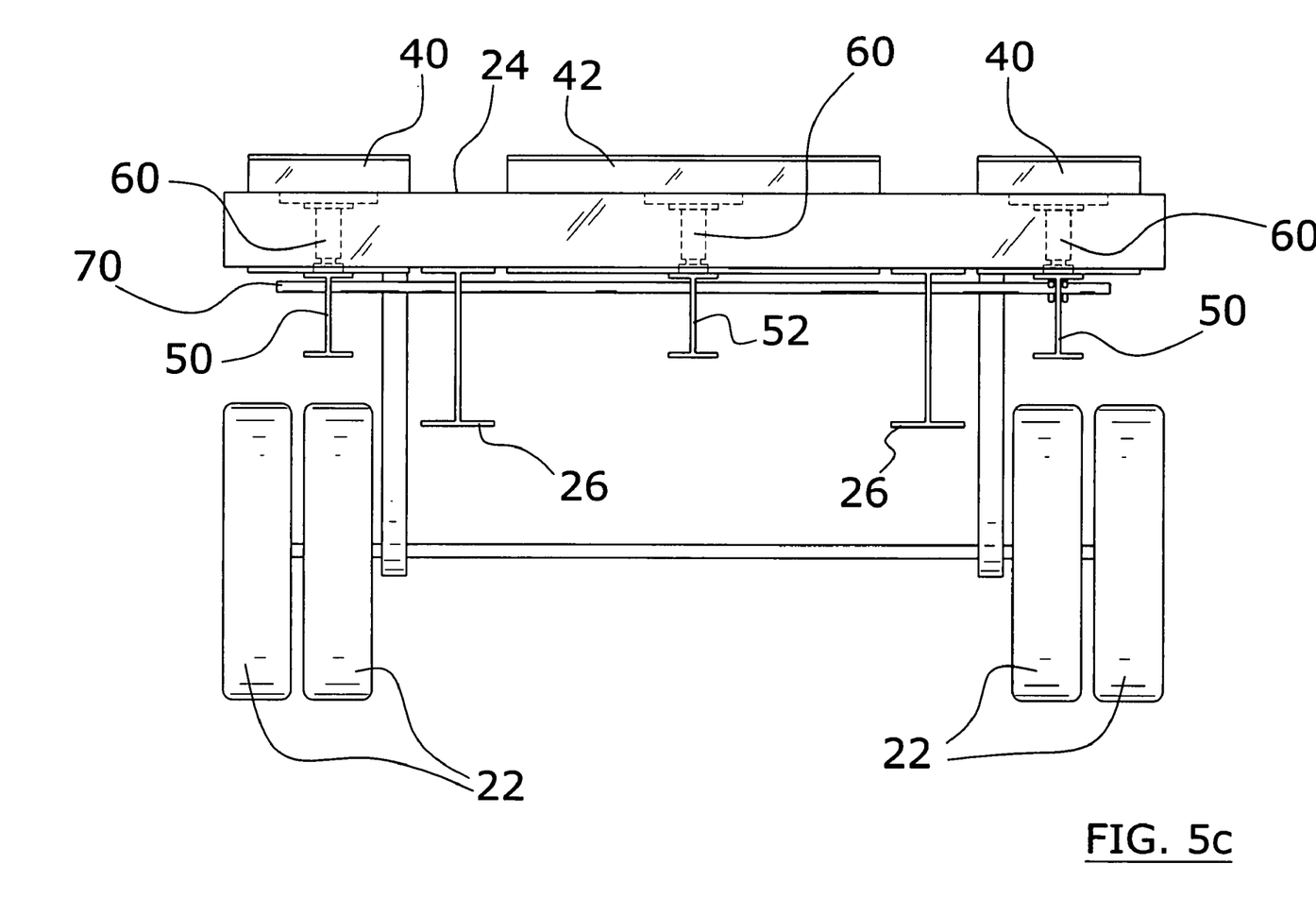
FIG. 5c is a rear end view of the present invention with the support members lowered and with the locking bar fully secured.

A plurality of locking apertures 72 preferably extend through the support frame 26 of the trailer 20 and the support members 50, 52 as shown in FIG. 4a of the drawings. A locking bar 70 is removably extendable through the locking apertures 72 for securing the support members 50, 52 in a raised position as illustrated in FIGS. 5b and 5c of the drawings. The locking bar 70 prevents the support members 50, 52 from accidentally lowering during travel with the trailer 20 while the supports 40, 42 support a load 12.

H. Operation of Invention

Figure 3A:
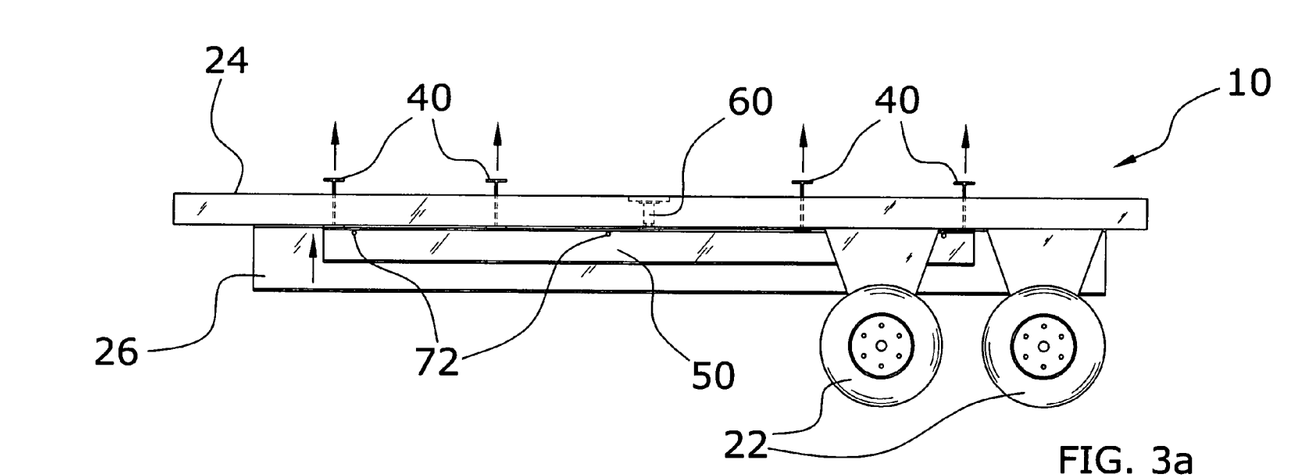
FIG. 3a is a side view of the present invention with the support members raised.
Figure 3B:
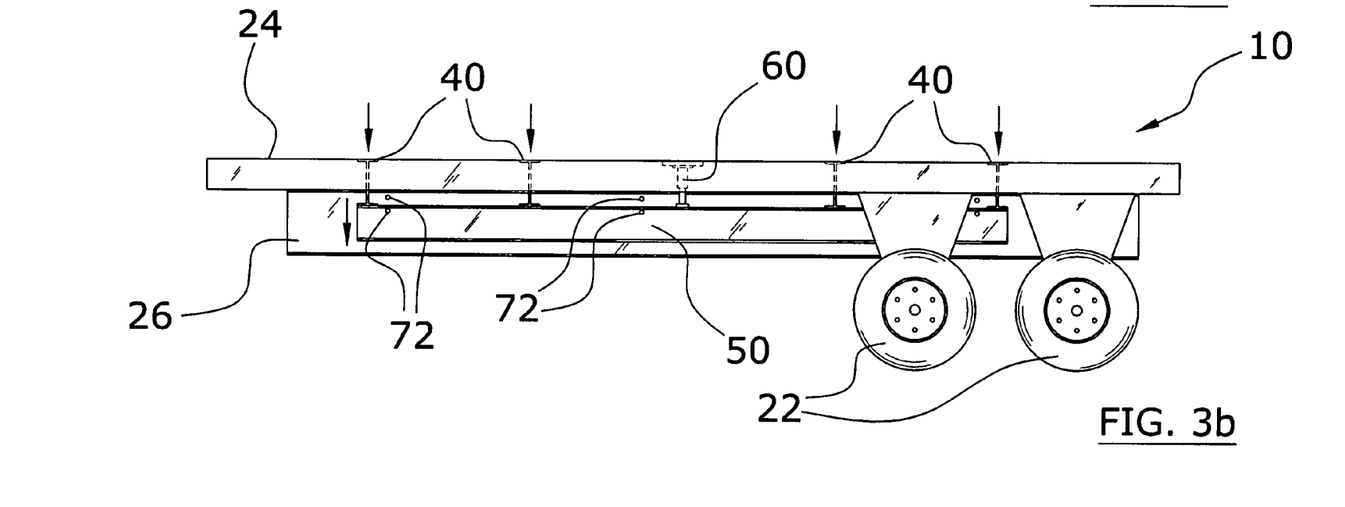
FIG. 3b is a side view of the present invention with the support members lowered.

In use, the operator of the trailer 20 determines the load 12 that will be placed upon the trailer 20. If the load 12 does not require elevation (e.g. vehicles, pallet supported loads 12), the operator lowers the support members 50, 52 thereby resulting in lowering of the supports 40, 42 so that the supports 40, 42 are substantially flush with the upper surface of the bed 24 of the trailer 20 as illustrated in FIGS. 1, 3b and 5a of the drawings.

Figure 4B:
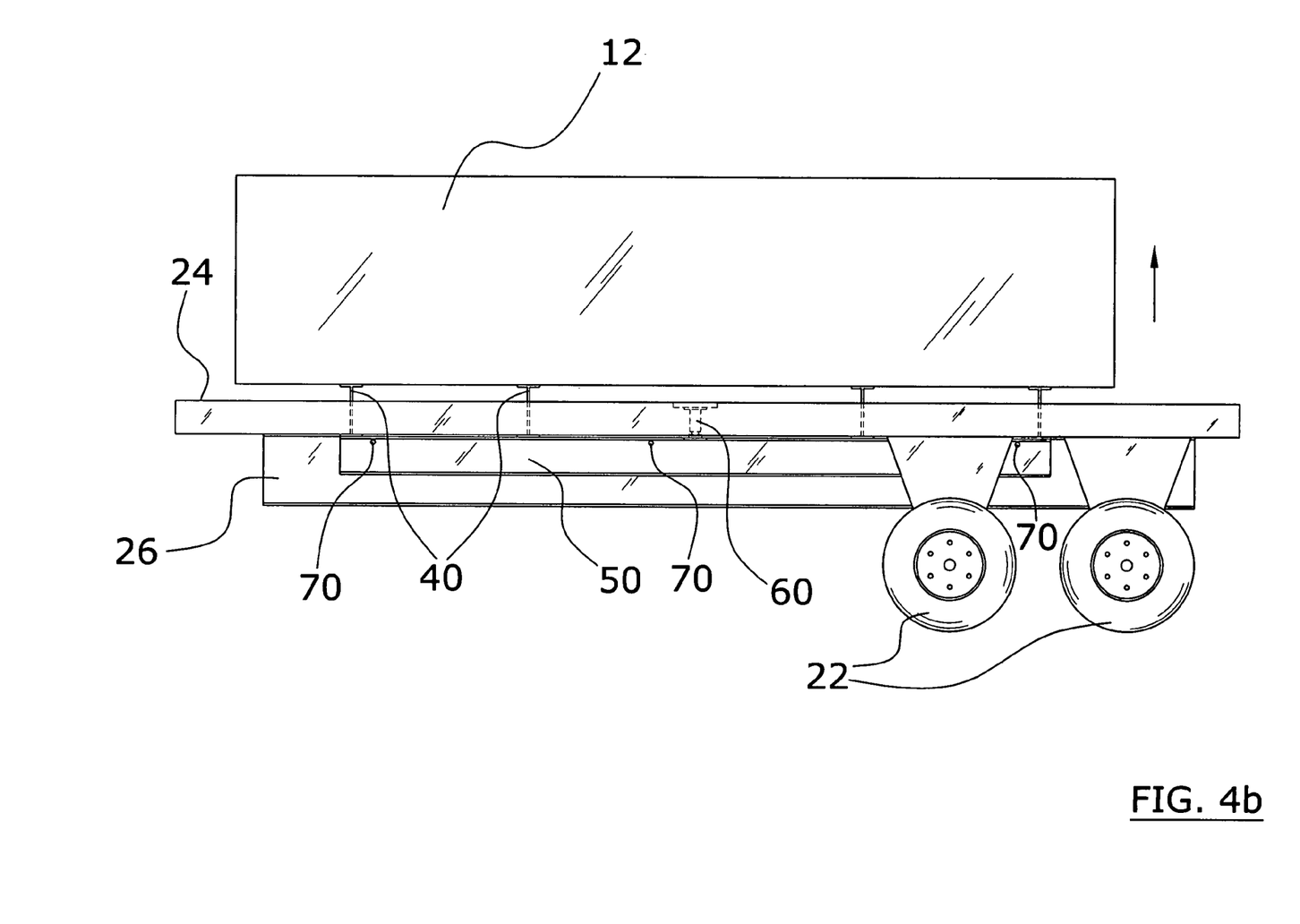
FIG. 4b is a side view of the present invention with the load supported by the support members in an elevated manner.

If the load 12 does require elevation (e.g. lumber, boxes), the operator then raises the support members 50, 52 thereby resulting in raising of the supports 40, 42 so that the upper ends of the supports 40, 42 are extended above the upper surface of the bed 24 of the trailer 20 a predetermined distance as illustrated in FIGS. 2, 3a, 4b, 5b, 5c and 6c of the drawings. The load 12 then can be positioned upon the supports 40, 42 as shown in FIG. 4b of the drawings. Alternatively, the load 12 may be positioned on the bed 24 of the trailer 20 before raising of the supports 40, 42 as shown in FIG. 4a of the drawings. After the supports 40, 42 are fully extended, the user then extends the locking bar 70 through the locking apertures 72 within the support frame 26 and the support members 50, 52 as shown in FIGS. 5b and 5c of the drawings. The load 12 may then be secured and transported to the desired location. Upon reaching the desired destination, the load 12 may then be unload 12ed with a forklift by the forklift operator extending the forks beneath the load 12 on the sides of the trailer 20 about the supports 40, 42. The trailer 20 may then be used again for various other types of loads 12.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A retractable load support system, comprising:
   a trailer having a bed, wherein said trailer is comprised of a flatbed structure;
   a plurality of openings within said bed;
   a plurality of supports extendable through said openings;
   a plurality of support members attached to said supports; and
   at least one actuator attached to said trailer and said support members for selectively lowering and raising said plurality of supports;
   a plurality of locking apertures extending through a support frame of said trailer and said plurality of support members, and a locking bar extendable through said locking apertures for securing said support members in a raised position.

2. The retractable load support system of claim 1, wherein said plurality of openings within said bed are comprised of a plurality of center openings and a plurality of outer openings.

3. The retractable load support system of claim 2, wherein said plurality of center openings are aligned with a longitudinal axis of said bed.

4. The retractable load support system of claim 3, wherein said plurality of outer openings are positioned on opposing sides of said center openings.

5. The retractable load support system of claim 4, wherein said plurality of outer openings form two opposing rows on opposing sides of said center openings.

6. The retractable load support system of claim 2, wherein said plurality of supports are comprised of a plurality of center supports movably positioned within said plurality of center openings and a plurality of outer supports movably positioned within said plurality of outer openings.

7. The retractable load support system of claim 6, wherein said plurality of support members are comprised of a center support member attached to said center supports and one or more outer support members attached to said outer supports.

8. The retractable load support system of claim 7, wherein said at least one actuator is comprised of a center actuator attached to said center support member and one or more outer actuators attached to said outer support members.

9. A retractable load support system, comprising:
   a trailer having a bed and a plurality of wheels, wherein said trailer is comprised of a flatbed structure;
   a plurality of openings within said bed;
   a plurality of supports extendable through said openings;
   a plurality of support members attached to said supports;
   at least one actuator attached to said trailer and said support members for selectively lowering and raising said plurality of supports;
   a plurality of locking apertures extending through a support frame of said trailer and said plurality of support members; and
   a locking bar extendable through said locking apertures for securing said support members in a raised position.

10. The retractable load support system of claim 9, wherein said plurality of openings within said bed are comprised of a plurality of center openings and a plurality of outer openings.

11. The retractable load support system of claim 10, wherein said plurality of center openings are aligned with a longitudinal axis of said bed.

12. The retractable load support system of claim 11, wherein said plurality of outer openings are positioned on opposing sides of said center openings.

13. The retractable load support system of claim 12, wherein said plurality of outer openings form two opposing rows on opposing sides of said center openings.

14. The retractable load support system of claim 10, wherein said plurality of supports are comprised of a plurality of center supports movably positioned within said plurality of center openings and a plurality of outer supports movably positioned within said plurality of outer openings.

15. The retractable load support system of claim 14, wherein said plurality of support members are comprised of a center support member attached to said center supports and one or more outer support members attached to said outer supports.

16. The retractable load support system of claim 15, wherein said at least one actuator is comprised of a center actuator attached to said center support member and one or more outer actuators attached to said outer support members.

* * * * *